July 10, 1956
R. C. JOST
2,754,499
STEERING INDICATOR
Filed July 6, 1954
2 Sheets-Sheet 1
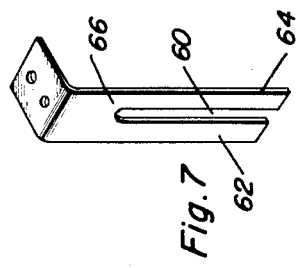
Fig. 7
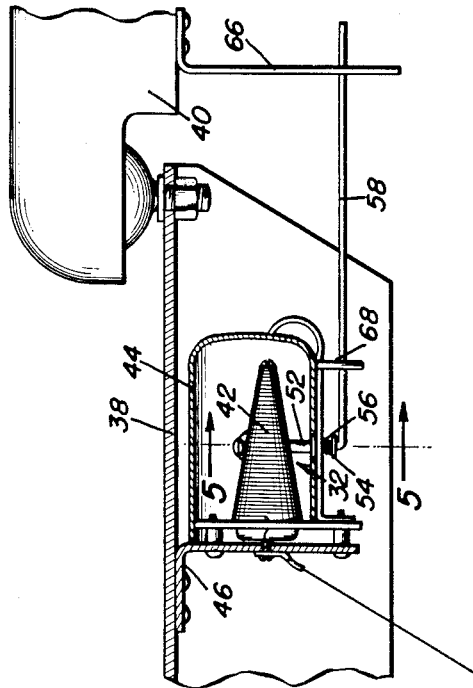
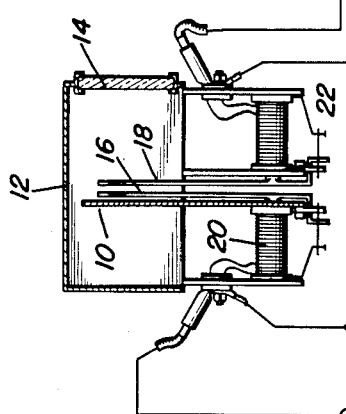
Fig. 1
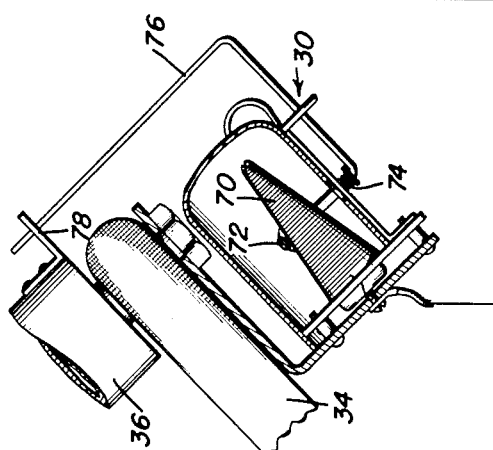
Raymond C. Jost
INVENTOR.
BY Clarence A. O'Brien
and Harvey B. Jackson
Attorneys July 10, 1956  R. C. JOST  2,754,499
STEERING INDICATOR
Filed July 6, 1954  2 Sheets-Sheet 2
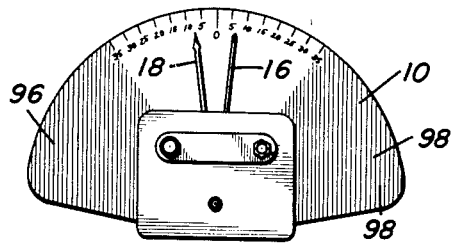
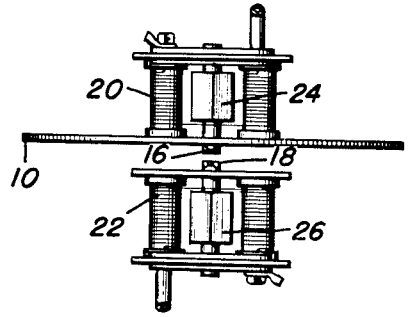
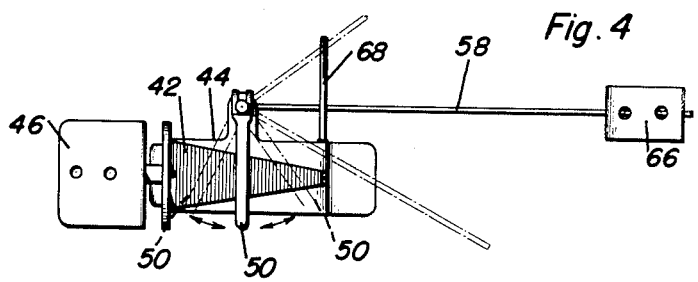
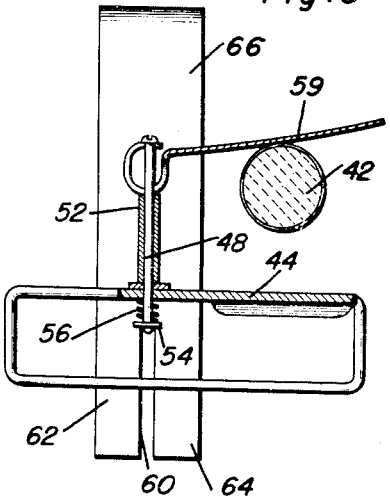
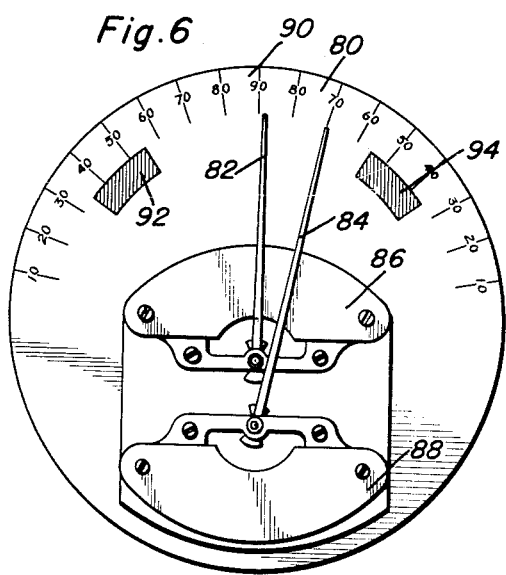
Raymond C. Jost
INVENTOR.

United States Patent Office 2,754,499
Patented July 10, 1956

2,754,499

STEERING INDICATOR

Raymond C. Jost, Hawthorne, Calif.

Application July 6, 1954, Serial No. 441,524

3 Claims. (Cl. 340—282)

This invention relates to a steering indicator for informing the operator of a towing vehicle of the relative angular relationship between the towing vehicle and its trailer.

The primary object of the present invention resides in the provision of a steering indicator which will not only inform the operator of the towing vehicle as to the relative position of the trailer, but will further inform the operator as to the precise angle which his front wheels are at with respect to the longitudinal axis of the towing vehicle, thereby warning the driver when safe limits of operation are being exceeded.

As is well known, when backing a trailer of a tractor-trailer combination, it has been very difficult for the operator to estimate the angular relationships and distances involved. Should a turn be made too sharply, there is the possibility that the trailer may jackknife, causing considerable damage to both the towing vehicle and the trailer. Additionally, other accidents are often a result from backing a trailer of a tractor-trailer combination into a confined area, especially where visibility is obscured. The present invention eliminates the possibility of many accidents by informing the operator of the vehicle as to the precise relationship which the trailer bears the towing vehicle.

The construction of this invention features novel rheostats formed from resistance coils and contact arms mounted on the towing vehicle and actuated by brackets mounted on the tractor vehicle and on the steering mechanism of the towing vehicle. These rheostats actuate pointers which cooperate with an indicator dial to provide the operator of the towing vehicle with the desired and necessary information.

Still further objects and features of this invention reside in the provision of a steering indicator that is simple in construction and manufacture, capable of being readily installed in any readily visible location on the towing vehicle, which is strong and durable, and which is inexpensive to produce, thereby enabling wide distribution and utilization.

These, together with the various ancillary objects and features of the invention which will become apparent as the following description proceeds, are attained by this steering indicator, preferred embodiments of which have been illustrated in the accompanying drawings, by way of example only, wherein:

Figure 1 is a schematic diagram illustrating the component elements of this invention and showing the circuit arrangements thereof;

Figure 2 is an elevational view of the indicator dial;

Figure 3 illustrates the magnetic means used for actuating the pointers;

Figure 4 is a plan view of the resistance coil and contact arm forming a rheostat for providing a variable signal to the magnetic means controlling the pointer;

Figure 5 is a vertical sectional view illustrating the construction of the contact arm and resistance coil;

Figure 6 is an elevational view of a modified form of indicator dial; and

Figure 7 is a perspective view of a bifurcated bracket utilized in the invention.

With continuing reference to the accompanying drawings, wherein like reference numerals designate similar parts throughout the various views, and with initial attention being given to Figures 1 and 2, it will be seen that therein there is provided an indicator dial 10 mounted within a casing 12 having a glass cover 14 and which is adapted to coact with pointers 16 and 18 to provide information to the operator of the towing vehicle as to the relative angular position of the trailer and of the front wheels of the towing vehicle so as to facilitate the maneuvering of the tractor-trailer combination in confined areas.

The pointers 16 and 18 are actuated by sets of coils 20 and 22 respectively which, in response to an electrical signal impressed thereon, actuate armatures 24 and 26, see Figure 3, to which the pointers 16 and 18 are attached. It is to be recognized that the construction of the coils 20 and 22 as well as the armatures 24 and 26 is conventional and is presently used as elements of fuel level indicators on various makes and models of automotive vehicles.

The signals are applied to the coils 20 and 22 by connecting across the conductor 28, which is connected to the ammeter of the towing vehicle and thence to a source of electrical power, suitable rheostats which are generally indicated by reference numerals 30 and 32. By changing the resistance value of the rheostats 30 and 32, the signal in the coils 20 and 22 can be controlled.

The rheostats 30 and 32 are substantially similar in construction and are attached respectively to the pitman shaft 34 on the towing vehicle and the steering column 36 thereof as well as to the tow bar 38 of the towing vehicle and the trailer hitch 40 of the trailer.

Considering the construction of the rheostat 32, it will be seen that there is provided a substantially conical shaped resistance coil 42 which is mounted within a casing 44 attached by a suitable bracket 46 to the tow bar 38. Extending upwardly through the casing 44 and rotatably mounted therein is a standard 48 which carries a resilient arm 50 which engages the coil 42. The standard 48 may include a rotatably mounted collar 52 if desired and also has a collar 54 adjacent the lower end thereof. A coil spring 56 resiliently, yieldingly engages the collar 54 and the underside of the casing 44 so as to continuously resiliently urge the arm 50 to its lowermost position and into engagement with the coil 42. The standard 48 has either integrally formed therewith or attached thereto a lever 58 which is engaged in the slot 60 between the bifurcated portions 62 and 64 of a bracket 66 secured to the trailer hitch 40. The lever 58 may extend through a suitable guide 68 appended to the casing 44 as may be desired.

The operation of this device is quite simple. Upon movement of the trailer hitch 40 relative to the tow bar 38 as will happen when the towing vehicle is turned, the bracket 66 will cause the lever 58 to pivot the standard 48. This in turn will cause the arm 50 to pivot in the directions as shown in the dotted lines in Figure 4. When the contact arm 50 engages the coil 42, a complete operative electrical circuit is formed from the current supply to ground, the lever 58 and bracket 66 being of course grounded through the hitch connection. It is to be understood that the source of electrical power is the battery, not shown, which is also grounded.

In Figure 1, there is also disclosed the precise construction of the rheostat 30 which includes a coil 70 similar to the coil 42 and which is engaged by a contact arm 72 which is spring-pressed, as at 74, and operated through a lever 76 which engages between the bifurcations of a bracket 78 attached to the steering column 36. Thus, the rheostat 30 is substantially similar to that of the rheostat 32 and operates in the same manner.

The signals emanating from the rheostats 30 and 32 will actuate the pointers 18 and 16, respectively, so as to indicate first the angular relationship of the wheels of the towing vehicle with respect to the longitudinal axis of the towing vehicle and also to indicate the relative angular relationship between the towing vehicle and the trailer.

In Figure 6, there is shown a modified form of the invention in which the indicator dial 80 cooperates with two pointers 82 and 84 having the coils 86 and 88 which actuate the pointers 82 and 84 and the armatures thereof arranged with the coils 86 elevated above the coils 88. The coils 86 and 88 are of the conventional construction usually used in fuel tank level indicators and the pointer 84 is arranged in an opposed relationship. Further, the coil 70 is connected in reverse order to the magnetic means 88 for correct movement of the pointer 84.

In addition to indicia 90 in the dial 80, zones of danger 92 and 94 may be colored in red as are danger zones 96 and 98 which are marked on dial 10.

From the foregoing, the construction and operation of the device will be readily understod and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A steering indicator for indicating the relative angular position of a towing vehicle and a trailer while providing an indication of the angular relationship of the front wheels of the towing vehicle and the trailer comprising an indicator dial having a pair of magnetically actuated pointers for movement relative thereto, magnetic means for moving said pointer, a first resistance coil adapted to be carried by said towing vehicle and connected to the magnetic means actuating a first of said pointers, a first contact arm resiliently engaging said resistance coil and being connected to said magnetic means actuating said first pointer, a second resistance coil adapted to be carried by said towing vehicle and being connected to the magnetic means actuating the second of said pair of pointers, a second contact arm resiliently engaging said second resistance coil and being connected to said magnetic means actuating said second of said pointers, said second contact arm being adapted to be actuated by the steering mechanism of said towing vehicle, the magnitude of the angle formed by the pointers determining the magnitude of the angle between the front wheels of the towing vehicle and the longitudinal axis of the trailer.

2. A steering indicator for indicating the relative angular position of a towing vehicle and a trailer while providing an indication of the angular relationship of the front wheels of the towing vehicle and the trailer comprising an indicator dial having a pair of magnetically actuated pointers for movement relative thereto, magnetic means for moving said pointer, a first resistance coil adapted to be carried by said towing vehicle and connected to the magnetic means actuating a first of said pointers, a first contact arm resiliently engaging said resistance coil and being connected to said magnetic means actuating said first pointer, a second resistance coil adapted to be carried by said towing vehicle and being connected to the magnetic means actuating the second of said pair of pointers, a second contact arm resiliently engaging said second resistance coil and being connected to said magnetic means actuating said second of said pointers, said second contact arm being adapted to be actuated by the steering mechanism of said towing vehicle, said contact arms being attached to standards, means for rotatably mounting said standards, spring means for urging said standards downwardly with said first arm and said second arm engaging said first and second resistance coils respectively, levers attached to said standards, first and second bifurcated brackets adapted to be attached to said trailer and said steering mechanism respectively, said bifurcated brackets engaging said levers, the magnitude of the angle formed by the pointers determining the magnitude of the angle between the front wheels of the towing vehicle and the longitudinal axis of the trailer.

3. A steering indicator for indicating the relative angular position of a towing vehicle and a trailer while providing an indication of the angular relationship of the front wheels of the towing vehicle and the trailer comprising an indicator dial having a pair of magnetically actuated pointers for movement relative thereto, magnetic means for moving said pointer, a first resistance coil adapted to be carried by said towing vehicle and connected to the magnetic means actuating a first of said pointers, a first contact arm resiliently engaging said resistance coil and being connected to said magnetic means actuating said first pointer, a second resistance coil adapted to be carried by said towing vehicle and being connected to the magnetic means actuating the second of said pair of pointers, a second contact arm resiliently engaging said second resistance coil and being connected to said magnetic means actuating said second of said pointers, said second contact arm being adapted to be actuated by the steering mechanism of said towing vehicle, said contact arms being attached to standards, means for rotatably mounting said standards, spring means for urging said standards downwardly with said first arm and said second arm engaging said first and second resistance coils respectively, levers attached to said standards, first and second bifurcated brackets adapted to be attached to said trailer and said steering mechanism respectively, said bifurcated brackets engaging said levers, said resistance coils being substantially conical in shape, the magnitude of the angle formed by the pointers determining the magnitude of the angle between the front wheels of the towing vehicle and the longitudinal axis of the trailer.

References Cited in the file of this patent

UNITED STATES PATENTS

| 561,431 | Pfatischer | June 2, 1896 |
| 923,511 | Greenbaum | June 1, 1909 |
| 2,214,161 | Cater | Sept. 10, 1940 |
| 2,492,531 | Lee | Dec. 27, 1949 |